Dec. 1, 1953  S. D. RUSSELL  2,660,949
BALER
Filed Nov. 16, 1946  2 Sheets-Sheet 1

INVENTOR.
Stanley D Russell
BY
Emerson B Donnell
ATTORNEY.

Dec. 1, 1953  S. D. RUSSELL  2,660,949
BALER

Filed Nov. 16, 1946  2 Sheets-Sheet 2

INVENTOR.
Stanley D Russell
BY
Emerson B Donnell
ATTORNEY.

Patented Dec. 1, 1953

2,660,949

UNITED STATES PATENT OFFICE 2,660,949

BALER

Stanley D. Russell, Racine, Wis., assignor to J. I. Case Company, Racine, Wis., a company of Wisconsin Application November 16, 1946, Serial No. 710,368

5 Claims. (Cl. 100—187)

The present invention relates to balers for baling hay or similar material and an object of the invention is to generally improve the construction and operation of devices of this class. The chambers of balers of commonly known form are ordinarily perforated with openings for various purposes and when the baler is run at common baling speeds, objectionable quantities of dust, pollen, and other extraneous airborne material, are expelled through these openings. Also appreciable quantities of the valuable leaves are so expelled and lost. Accordingly, a further object of the invention is to provide a baler which will avoid the expelling of dust and the like and also the loss of the leaves as aforesaid.

More specifically, an object is to provide a retaining dog for a baler which will avoid any opening in the bale case and to simplify the dog construction so that damaged or broken dogs can easily be repaired or replaced.

A further object is to reduce the inertia of the dog so as to result in a quicker action and to allow the use of a weaker spring.

Another object is to provide a virtually airtight baling chamber (when the baled material is in place) so that a partial vacuum is formed when the plunger is withdrawn, which vacuum will aid in charging the baler.

Other objects will be apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention as herein expressed.

The conventional baler comprises a case generally rectangular in cross section having a plunger which reciprocates in the case and compresses the material to be baled. As the resulting bale advances through the casing, it passes through a slightly constricted portion which provides a resistance to the outward movement of the bale. This resistance aids in compacting subsequent bales. In other words, it provides an abutment against which the plunger may compress material being fed into the machine. It also acts as a plug for the otherwise open end of the bale chamber for a purpose to appear.

The bale being formed is resilient and tends to expand and follow the retreating plunger if not held in place. This is commonly prevented by pawls or dogs located slightly in advance of the extreme end of the compression stroke of the plunger. These dogs commonly protrude into the chamber through suitable openings so as to hold material against rearward expansion, but they swing outwardly away from the material so as to allow movement thereof under the action of the plunger. The above mentioned dust, pollen and leaves commonly escape through the openings about these dogs making a very objectionable condition for operators who must remain near the bale case. Also the dust is detrimental to the tractor and engine driving the baler, if any.

Figure 2:
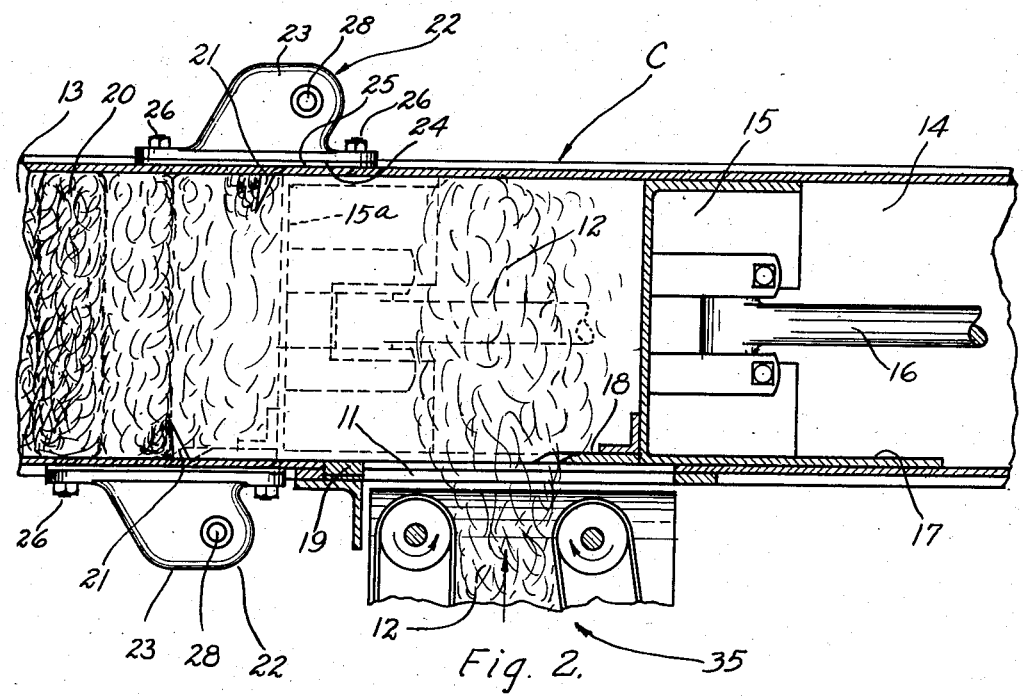
Fig. 2 is a horizontal section substantially on line 2—2 of Fig. 1.
Figure 1:
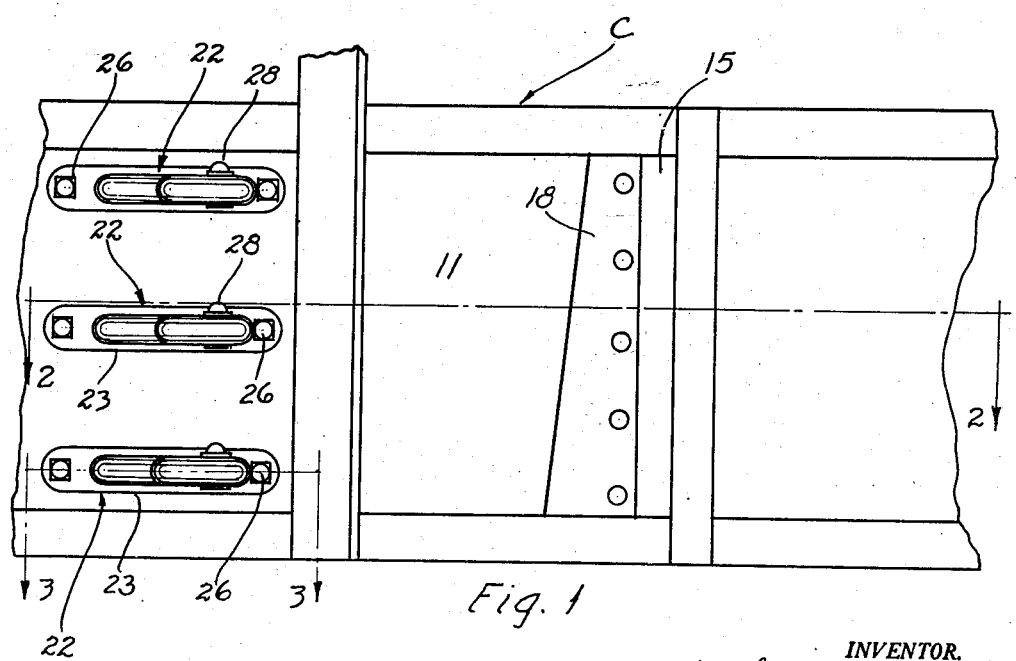
Figure 1 is a side elevation of a bale chamber with parts removed and showing the loading opening, dog brackets and part of the plunger.

As seen in Figs. 1 and 2, the present illustrative embodiment comprises a baling chamber or casing generally designated as C, usually of rectangular cross section and commonly supported on wheels or the like for transportation over a field. These details being well-known, and forming no part of the present invention, are not shown.

Casing C has a charging opening 11 in this instance located in a vertical side thereof and through which the hay generally designated as 12 is introduced. One end of casing C is open and through which the completed bale emerges, this end 13 being slightly constricted as is well-known so as to develop resistance to the movement of the bale therethrough, the compacted material held in this constricted end acting as a plug or back wall for the casing which would otherwise be completely open to the atmosphere.

The other end 14 of casing C is closed by a plunger 15 which is reciprocated within casing C by a pitman 16 connected to a crank of well-known form which is not part of this invention and therefore not shown. Plunger 15 travels from a point substantially clear of opening 11 to a point beyond opening 11 as shown in dotted lines in Fig. 2 and has an apron 17 which closes opening 11 against entrance of material when the plunger is in this position. A knife 18 is secured to plunger 15 in any suitable manner and cooperates with an abutment or shear plate 19 secured to the edge of opening 11 so as to sever on each stroke of the plunger the blanket of material 12 entering opening 11, and the plunger carries the severed material forward to the end of its stroke resulting in a compacted body or pad of material 20.

To prevent pad 20 from expanding and following plunger 15 upon its return stroke, dogs 21 are placed just in advance of the limit of plunger movement. These dogs are forced out of the way by compressing movement of the material but return to substantially the position shown when the material tends to follow the plunger in its retracting movement.

Balers of the type so far described are well-known and a baler of this general type is disclosed in applicant's patent, No. 2,381,620, August 7, 1945 and filed June 8, 1942.

Figures 3, 4:
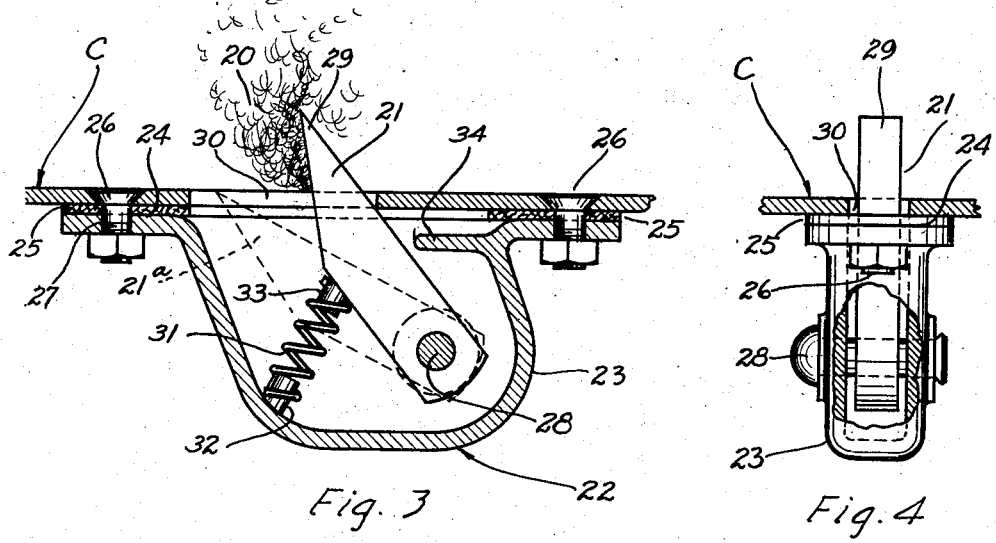
Fig. 3 is an enlarged sectional view taken on the line 3—3 of Fig. 1.
Fig. 4 is an end view of a dog bracket as shown in Figs. 1, 2 and 3 with parts broken away.

In order to avoid discharge of dust, pollen, leaves, and other extraneous airborne material, about dogs 21, a special construction has been devised. Hollow brackets generally designated as 22 are arranged, in this instance in groups of three, one group on the front and one on the rear wall of case C, as shown in Figs. 1 and 2. Each bracket comprises a cover or housing portion 23 of a suitable shape and which has a flat surface 24 (see also Fig. 3) in contact with casing C, a gasket 25 being interposed so as to obtain a substantially airtight fit. Bolts 26 pass through holes 27 in housing 23 and secure brackets 22 to casing C, it being understood that gasket 25 may be omitted if a satisfactory fit is obtained by other well-known means.

Above mentioned dog 21 is journaled freely in housing 23 on a rivet or pin 28 and protrudes into casing C an amount sufficient to prevent the undesired rearward movement of the hay or other material, a point portion 29 being arranged to swing clear of the casing so as not to interfere with the compressing movement of the material proceeding through the baler. Dog 21 projects into the casing through an opening 30 which is of a size to allow dog 21 to swing entirely clear of the casing C and into housing 23 as shown at 21a.

A spring 31 urges dog 21 into casing C and is engaged about a stud 32 secured to housing 23 and also about a stud 33 secured to dog 21. Spring 31 is thereby secured against displacement. Dog 21 preferably rests against the side of opening 30 and is urged thereagainst by spring 31 but a portion 34 of housing 23 serves as a stop for dog 21 to prevent excessive movement of the dog when housing 23 is removed from casing C. This facilitates assembly of the parts since it prevents spring 31 from becoming disengaged from studs 32 and 33.

For introducing material into casing C, a conveyor generally designated as 35 of any suitable design carries the hay or other material into charging opening 11.

Conveyor 35 may be of any suitable design but preferably is similar to that disclosed in applicant's above identified patent.

It will now be apparent that hay or similar material is introduced through opening 11 by feeder 35 and cut off and compressed by plunger 15 and knife 19. The action of the plunger traps air along with material 12 but this air is prevented from blowing out through openings 30 since the latter are entirely covered by the housings 23. The air is thereby forced to filter through the compacted material of previous feeds or pads 20 whereby the dust, pollen, leaves, and other extraneous airborne material, are effectively trapped and prevented from escaping to annoy the attendants. Also the valuable leaves are not lost but are trapped in the bale for subsequent utilization.

It will now be apparent that, since the bale and its chamber have no substantial openings, a suction effect will be developed when plunger 15 returns. Herein lies another advantage of the invention which will be set forth presently.

No means of tying bales is disclosed as this feature of baler operation is well understood by those skilled in the art and is not part of this invention.

As hereinbefore suggested, assuming that casing C is reasonably air-tight, and that plunger 15 has started to withdraw from the compressing position 15a as plunger 15 moves away from the pad just compressed, the dogs 21 prevent the pad just formed from expanding back toward the opening 11. In the mean time, hay or other material has been accumulating against the apron 17 of plunger 15, being urged thereagainst by conveyor 35. As plunger 15 approaches the opening 11, an appreciable suction has been developed in casing C which is released by uncovering of opening 11 by the movement of plunger 15. This suction is of such force, as to materially assist in drawing the accumulated mass of hay or other material into casing C through opening 11. This is only possible because casing C is rendered substantially airtight by the previously formed pads 20 and the particular construction of the dogs.

The above being a complete description of an illustrative embodiment of the invention, what is claimed as new and desired to be secured by Letters Patent of the United States is:

1. In a material retaining device for a baler, the combination of a bale case provided with an opening, a housing secured over the opening in substantially airtight relation thereto, a pivot within the housing and supported thereby, a dog supported on the pivot adjacent the opening, and means for yieldingly urging the dog into the bale case through the opening.

2. In a material retaining device for a baler, the combination of a bale case provided with an opening, a housing secured over the opening in substantially airtight relation thereto, a pivot within the housing and supported thereby, a dog supported on the pivot adjacent the opening, means for yieldingly urging the dog into the bale case through the opening, and a stop portion on the housing and positioned to interrupt said dog and prevent extension thereof from said housing more than a predetermined amount when said housing is removed from said chamber.

3. In a material retaining device for a baler, the combination of a bale case provided with an opening, a housing secured over the opening in substantially airtight relation thereto, a pivot within the housing and supported thereby, a dog supported on the pivot adjacent the opening, a spring stressed between the dog and housing for yieldingly urging the dog into the bale case through the opening, and a stop portion on the housing and positioned to intercept said dog and prevent extension thereof from said housing beyond a position where said spring is retained between said dog and said housing.

4. In a material retaining device for a baler, the combination of a bale case provided with an opening, a housing secured over the opening in substantially airtight relation thereto, a dog within the housing and movably supported thereby adjacent the opening, and means for yieldingly urging the dog into the bale case through the opening.

5. In a material retaining device for a baler the combination of a bale case provided with an opening, a housing secured over the opening in substantially airtight relation to the margins thereof and communicating therethrough with the interior of said bale case, a dog pivotally supported within the housing adjacent said opening, said housing provided with an abutment positioned to limit the movement of said dog in one direction, said dog having a spring retaining lug, said housing having a spring retaining lug opposed to the first mentioned spring retaining lug, and a resilient member interposed between said housing and said dog and engaged with said lugs to urge said dog out of said housing and into said bale case.

STANLEY D. RUSSELL.

References Cited in the file of this patent

UNITED STATES PATENTS

| Number | Name | Date |
|---|---|---|
| 2,068,886 | MacDonald | Jan. 26, 1937 |
| 2,123,681 | Willgoos | July 21, 1938 |
| 2,294,440 | Barker | Sept. 1, 1942 |
| 2,362,861 | Russell | Nov. 14, 1944 |
| 2,381,620 | Russell | Aug. 7, 1945 |